United States Patent [19]

McMurtry

[11] 4,078,314
[45] Mar. 14, 1978

[54] MEASURING APPARATUS

[75] Inventor: David Roberts McMurtry, Bristol, England

[73] Assignees: Rolls-Royce Ltd., Bristol; Renishaw Electrical, Ltd., both of England

[21] Appl. No.: 685,073

[22] Filed: May 10, 1976

[30] Foreign Application Priority Data

May 13, 1975 United Kingdom ............... 20017/75

[51] Int. Cl.² .............................................. G01B 7/02
[52] U.S. Cl. .................................. 33/174 L; 33/1 M; 33/172 E
[58] Field of Search ................ 33/1 M, 169 R, 172 R, 33/172 E, 174 R, 174 L, 174 P, 174 PC

[56] References Cited

U.S. PATENT DOCUMENTS

| 3,241,243 | 3/1966 | Speer | 33/1 M |
| 3,869,799 | 3/1975 | Neuer et al. | 33/174 L |
| 3,888,012 | 6/1975 | Droz | 33/174 L |
| 3,945,124 | 3/1976 | Jacoby et al. | 33/172 E |
| 3,990,153 | 11/1976 | Calame | 33/1 M |

FOREIGN PATENT DOCUMENTS

| 24,834 | 10/1969 | Japan | 33/1 M |

Primary Examiner—Richard E. Aegerter
Assistant Examiner—Richard R. Stearns
Attorney, Agent, or Firm—Stevens, Davis, Miller & Mosher

[57] ABSTRACT

In a work piece measuring probe the movement of a stylus in three dimensions is sensed by respective inductive transducers having sensing coils fixed to a support in positions adjacent three mutually perpendicular surfaces defined on the stylus.

6 Claims, 7 Drawing Figures

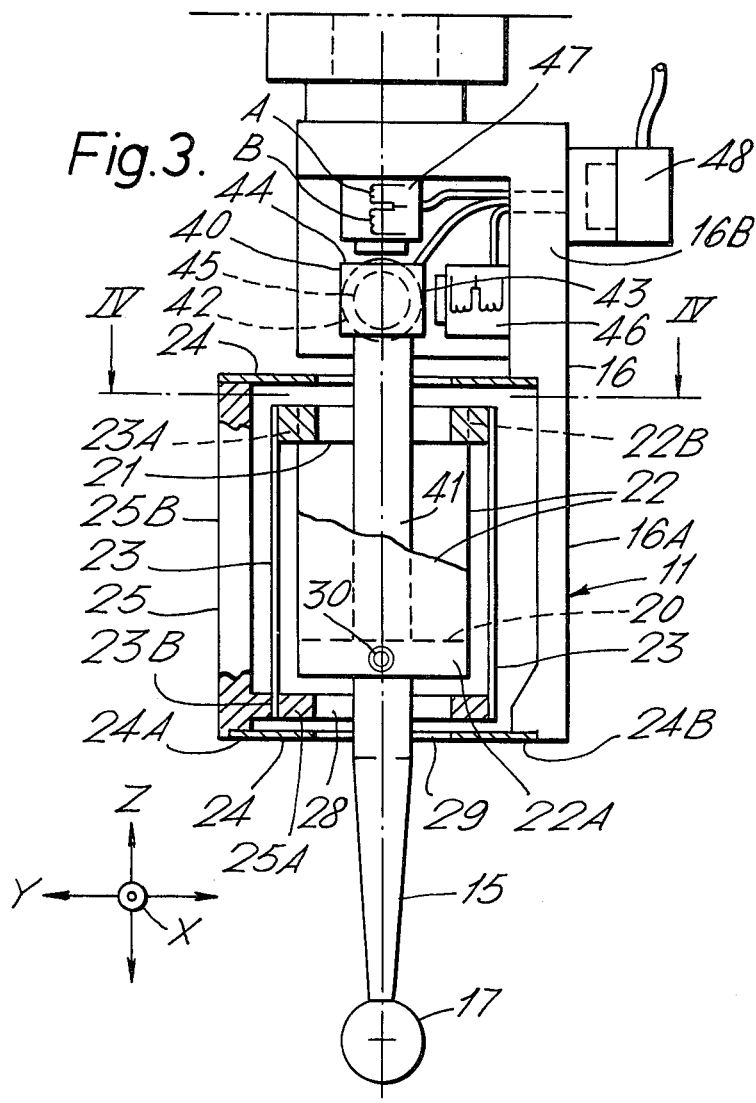
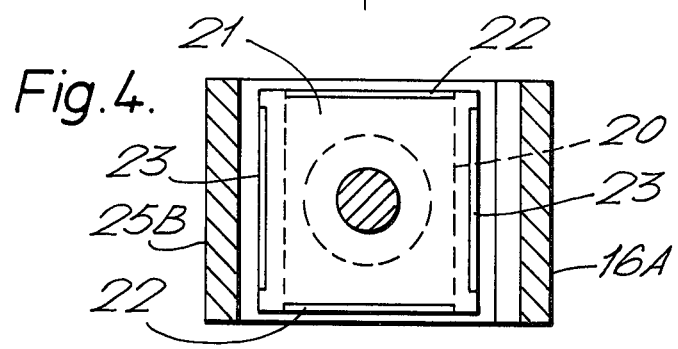

MEASURING APPARATUS

This invention relates to measuring apparatus.

It is known for such apparatus to have a stylus connected to a support for movement in two dimensions of a rectangular co-ordinate system. For example, the stylus may be connected to an intermediate member for movement in the one dimension while the intermediate member is connected to the support for movement in the other dimension. If both movements have to be measured it is usual to provide a sensor between the stylus and the intermediate member and a second sensor between the intermediate member and the support. However, if for example the connection between the stylus and the intermediate member is such that stylus movement relative to this member is necessarily non-linear so that the main movement in the one dimension has a component movement in the other dimension, then while the main movement is sensed by the first sensor the component movement is not sensed by the second sensor and the true two-dimensional position of the stylus relative to the support is not ascertained. It is an object of this invention to overcome this difficulty.

According to this invention there is provided measuring apparatus wherein a stylus is connected to an intermediate member for movement in one dimension of a rectangular co-ordinate system and the intermediate member is connected to a support for movement in another dimension; and comprising means defining on the stylus two surfaces respectively perpendicular to said dimensions, and two position sensors each secured to the support in positions confronting the respective surfaces thereby to sense movement of the stylus in the respective dimensions.

Examples of apparatus according to this invention, being in the form of probes for use with an inspection machine, will now be described with reference to the accompanying drawings wherein:

FIG. 3 is a sectional elevation of the probe.

FIG. 4 is a section of the line IV—IV in FIG. 3.

Figure 1:
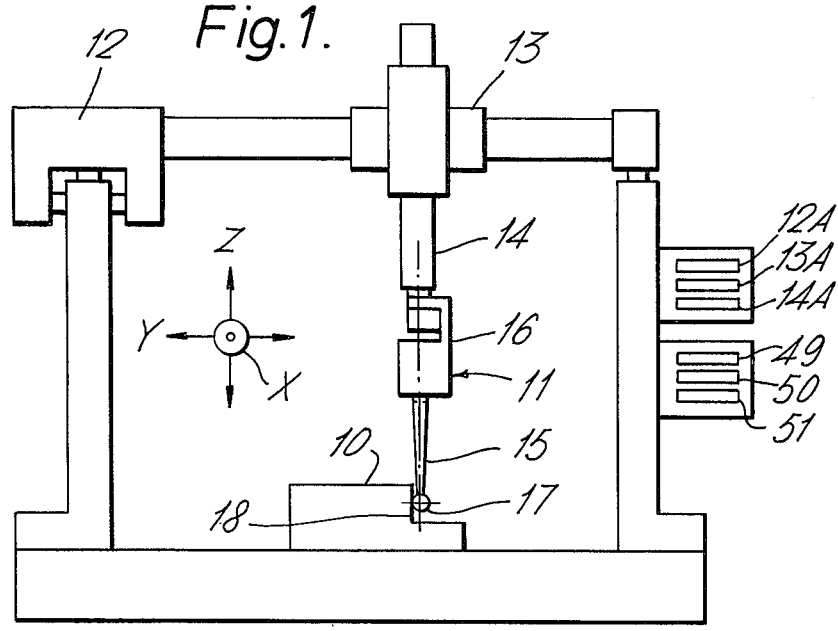
FIG. 1 is an elevation of an inspection machine including said probe.

An example of the use of the probe will at first be described with reference to FIG. 1. The probe, denoted 11, is supported by carriages 12, 13, 14 movable in the X, Y and Z directions of a right angle co-ordinate system. The movement of the carriages is indicated by respective digital displays 12A, 13A, 14A. The probe has a stylus 15 supported relative to a support or housing 16 for movement in the X, Y and Z directions and is biased by a spring system (to be described) into a zero position relative to the housing. To measure a work piece 10 the appropriate carriage, say the carriage 13, is moved until a ball end 17 of the stylus touches a relevant surface 18 of the work piece. This disturbs the zero position of the probe and results in a signal which is used to stop the display 13A of the carriage movement, the display then showing the position of said surface relative to a pre-selected datum. The carriage is of course stopped, either automatically or by the operator, as soon as possible after contact between probe and work piece but a certain overrun of the carriage (FIG. 2) is of course unavoidable. In some applications the workpiece is measured by measuring the overrun of the probe and deducting this from the measurement of the position which the carriage has when stopped at the end of the overrun. However, the housing 16 may be fixed and the probe maybe used as a measuring device independently of the carriages 12, 13, 14.

STYLUS SUPPORT SYSTEM

Referring to FIGS. 3 and 4, the stylus is generally rod-shaped and extends between the ball 17 and a member 20 connected to the housing 16 by three pairs of leaf springs 22, 23, 24 inter-connected in series and arranged to flex in the X, Y and Z dimensions respectively. To this end the springs 22 lie in planes including the Y and Z dimensions, and the springs 23 lie in planes including the X and Z dimensions, and the springs 24 lie in planes including the X and Y dimensions. The member 20 and a part 16A of the housing constitute end members of the in-series connection of the spring pairs.

In order to explain the spring arrangement each spring may be regarded as having a free and a fixed end, the fixed end being the end which, in the in-series connection, is nearest the housing 16. The connections between the springs may then be defined by saying that the springs 22 have free and fixed ends 22A, 22B secured respectively to the member 20 and an intermediate member 21, the springs 23 have free and fixed ends 23A, 23B secured respectively to the member 21 and a second intermediate member 25, and the springs 24 have free and fixed ends 24A, 24B secured respectively to the member 25 and a part 16A of the housing 16.

In order to bring about a compact space-saving arrangement of the springs 22, 23, 24, these springs are grouped as if lying in the six sides of a rectangular box. More specifically, the arrangement is such that the springs 23 extend from their free ends 23A towards the free ends 22A of the springs 22 and lie adjacent the latter ends, and the springs 22, 23 are situated in the space between the springs 24.

To make possible the connection between the springs 23, 24 to the second intermediate member 25, the latter has a part 25A connecting the fixed ends of the springs 23 and a perpendicular part 25B connecting the free ends of the springs 24, the fixed ends of the latter spring being connected by the part 16A.

As shown, the member 20 to which the stylus is secured is innermost to the box formed by the springs 22, 23, 24. Hence the member 25A and the adjacent spring 24 have holes 28, 29 for the stylus to extend to the exterior of the said box. But such holes would not be necessary if the stylus is connected to an edge of the member 20, as by being screwed into a hole 30, to extend in the plane of the dimensions X, Z.

The springs 22, 23, 24 may be secured to the members 20, 21, 16 by brazing.

MEASURING SYSTEM

Figure 2:
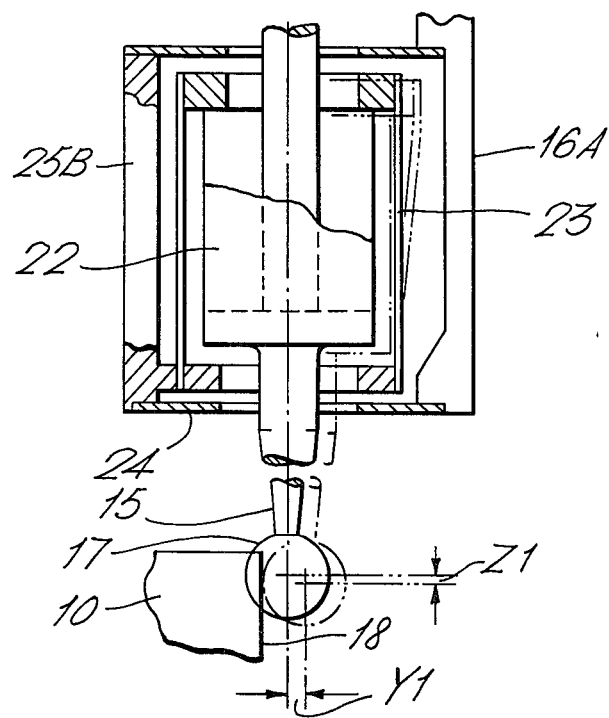
FIG. 2 is a detail of the probe.

As mentioned, the springs 22, 23, 24 bias the stylus into a zero position. This position is defined by the position adopted by the center of the ball 17 solely under the action of the springs and gravity, i.e. when there is no external force on the ball. FIG. 2 shows this zero position in full lines. Engagement with the face 18 of the work piece is shown as having resulted in a displacement Y1 in the Y dimension as shown in dotted lines. Due to the way in which the shape of the springs, in this case the springs 23, changes during the displacement Y1 there inevitably occurs also a secondary displacement Z1 in the Z dimension. Generally, a displacement in any one dimension results in a secondary displacement in at least one of the other dimensions, and a true reading of the co-ordinate position of the ball 17 requires that all three dimensions, or two dimensions if only two dimensions are required, are sensed at the same time.

Figure 7:
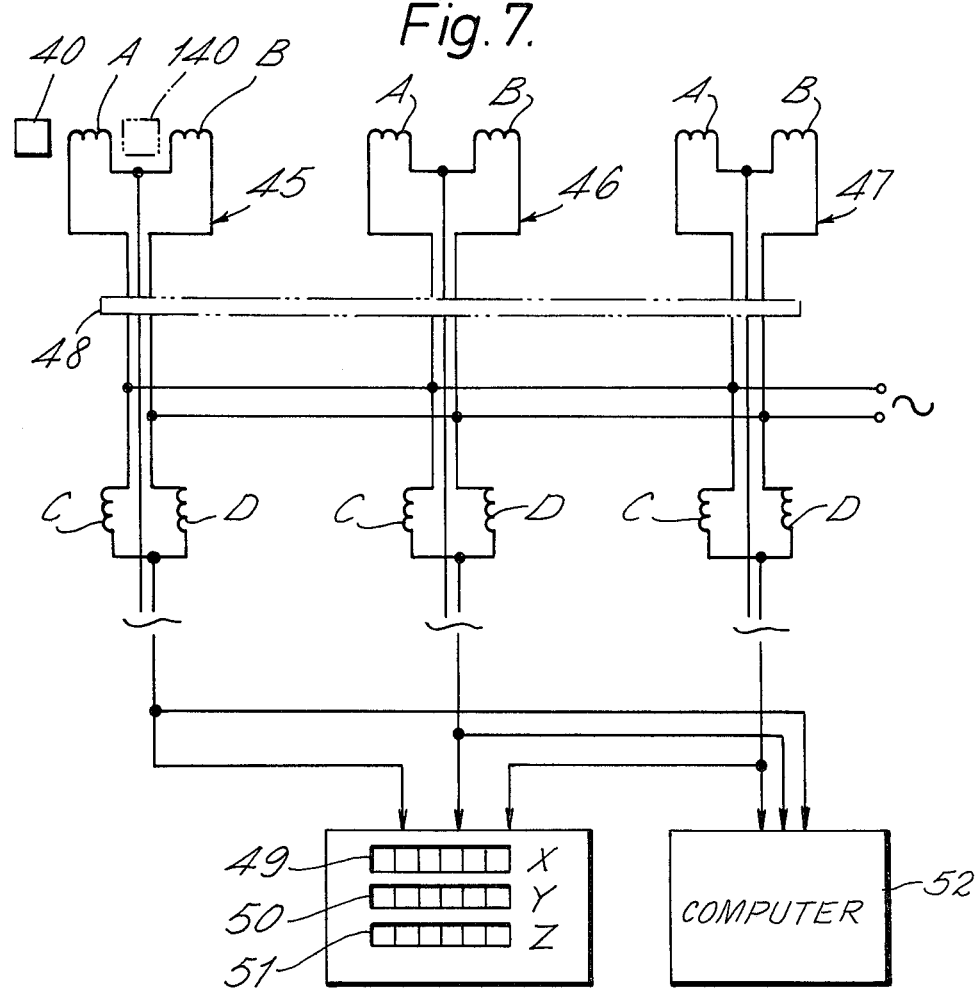
FIG. 7 is a circuit diagram.

The measuring system comprises (FIGS. 3, 4) an iron mass 40 secured to the member 20 by an extension 41 so as to accompany any movement of the stylus 15. The mass 40 has surfaces 42, 43, 44 respectively facing in the X, Y and Z dimensions and respectively confronting three sensors or transducers 45, 46, 47 mounted on a part 16B of the housing 16. Each transducer comprises an induction bridge (FIG. 7) whereby to sense a displacement of the mass in the respective dimension X, Y or Z.

Each bridge comprises coils A, B, C, D of which the coils A, B are located on the housing member 16B in proximity with the respective surface 42, 43 or 44, and the coils A, B are connected through a plug 48 to a convenient stationary location where the remainder of the bridge is situated. The sensing of, for example, displacement in the Y dimension occurs because the movement of the ball 17 changes the distance between the surface 43 and the coils A, B of the transducer 46 and thereby changes the balance of the relevant bridge A, B, C, D. Only movement of the surface 43 in the Y dimension is sensed. Movement in the X or Z dimensions does not affect the transducer 46 because movements do not affect the distance between surface 43 and the adjacent coils A, B. To ensure this condition the surfaces 42, 43, 44 should be reasonably flat and they must of course be perpendicular to the respective X, Y and Z dimensions. The bridges are in turn connected to respective display units 49, 50, 51 or to a computer 52 for relating the transducer outputs to the position of the carriages 12, 13, 14. In the present example the coils A, B of the respective bridges are situated both at one side of the mass 40.

Figure 5:
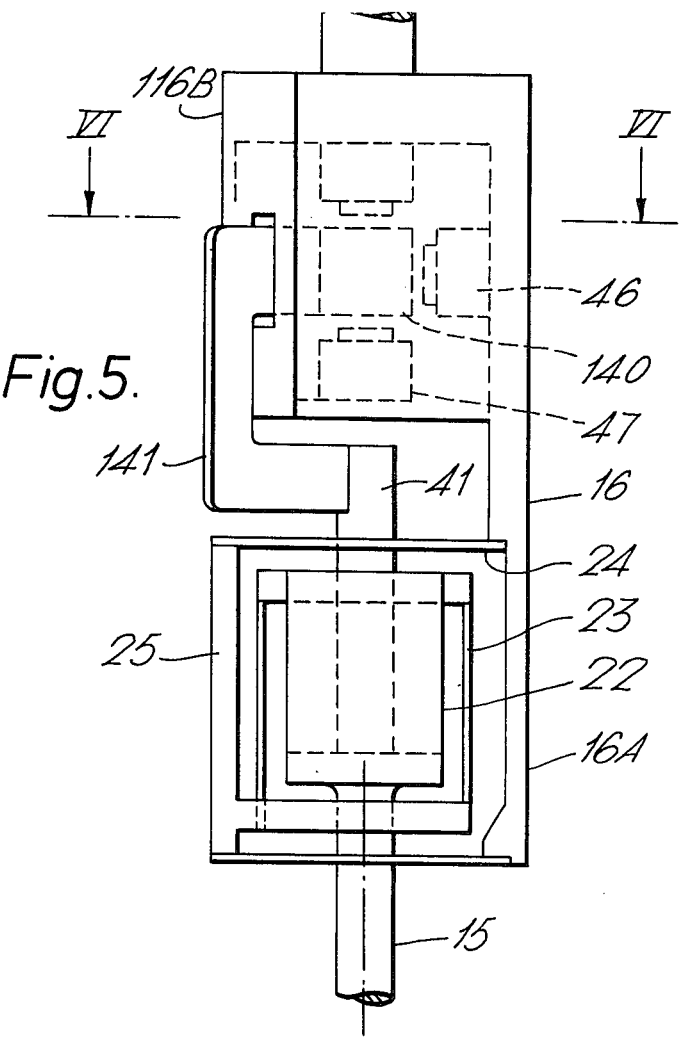
FIG. 5 is an elevation of a modified form of the probe.
Figure 6:
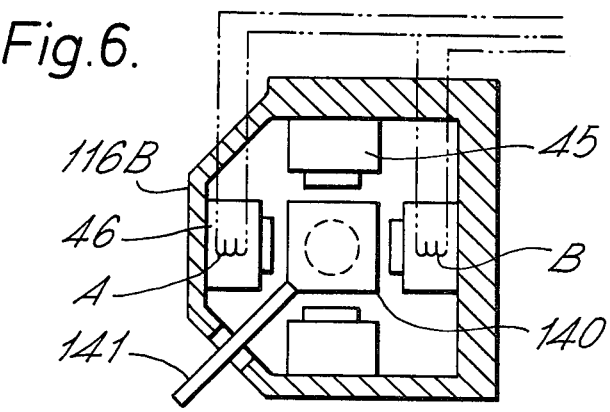
FIG. 6 is a section on the line VI—VI in FIG. 5.

In modification (FIGS. 5, 6) the coils A, B are situated at opposite sides of the mass. As shown, the mass is in the form of a cube 140 surrounded by a chamber 116B having walls supporting the coils A, B of the respective transducers 45, 46, 47 at opposite sides of the cube 140. The cube is connected to the stylus 15 by a U-shaped blade 141 secured between the support 41 and on edge of the cube so as to lie clear of the three pairs of oppositely facing surfaces of the cube. This arrangement of the coils improves linearity of read-out.

What we claim is:

1. Probe for use in measuring apparatus comprising a probe support member, a stylus holder, means for supporting the stylus holder on the support member for translation in three orthogonal dimensions, means carried on said stylus holder defining three flat mutually perpendicular surfaces respectively perpendicular to said three dimensions, three proximity sensors secured to the support member in positions confronting the respective flat surfaces and each positioned to sense movement of the adjacent said surface in a direction perpendicular thereto.

2. Probe according to claim 1 comprising a mass of magnetically responsive material extending from the stylus support member and defining said surfaces, and wherein the sensors comprise inductive means cooperating to sense movement of the mass.

3. Probe according to claim 1 comprising an extension extending from the stylus holder, a head of magnetically responsive material provided at the free end of the extension and defining said surfaces, and wherein the sensors comprise inductive means cooperating to sense movement of the head.

4. Probe according to claim 1 comprising an extension connected to the stylus holder to move together therewith, a head secured to the extension at the end thereof remote from the stylus holder, the head defining said three surfaces, one of said surfaces facing away from the stylus holder, the head being spaced from said sensors with clearance therebetween, the head being made of magnetically responsive material, and wherein the sensors comprise inductive means for sensing movement of the head.

5. Probe according to claim 1 wherein said means for supporting the stylus support member comprise a first, a second and a third parallelogram unit, each of said units comprising a pair of spaced apart rigid members and a pair of spaced resilient members secured to the rigid members in position therebetween, said units being connected in series in the sense of there being one rigid member common to the first and second units and another rigid member common to the second and third units, the remaining rigid members of the first and third units being common respectively to the stylus holder and the support member.

6. Probe according to claim 1 wherein said means for supporting the stylus holder comprise a first and a second rigid member arranged in spaced relationship, a pair of resilient members connected to the rigid members in position therebetween, said first rigid member constituting said stylus holder, a first extension constituting a stylus connected to the side of the first rigid member facing away from the second rigid member, means defining an opening in the second rigid member, a second extension connected to the side of the first rigid member confronting the second rigid member and extending with clearance through said opening, the second extension having an end situated at the side of the second rigid member facing away from the first rigid member, and said flat surfaces being provided on said end of the second extension.

* * * * *